United States Patent
Horne

(10) Patent No.: US 11,482,342 B2
(45) Date of Patent: Oct. 25, 2022

(54) NUCLEAR FUSION REACTOR WITH TOROIDAL SUPERCONDUCTING MAGNETIC COILS IMPLEMENTING INERTIAL ELECTROSTATIC HEATING

(71) Applicant: Tanner L. Horne, Longmont, CO (US)

(72) Inventor: Tanner L. Horne, Longmont, CO (US)

( * ) Notice: Subject to any disclaimer, the term of this patent is extended or adjusted under 35 U.S.C. 154(b) by 230 days.

(21) Appl. No.: 16/595,266

(22) Filed: Oct. 7, 2019

(65) Prior Publication Data

US 2020/0111583 A1    Apr. 9, 2020

Related U.S. Application Data

(60) Provisional application No. 62/742,416, filed on Oct. 7, 2018.

(51) Int. Cl.
| | |
|---|---|
| *G21B 1/05* | (2006.01) |
| *G21B 1/11* | (2006.01) |
| *H05H 1/11* | (2006.01) |
| *H01F 6/06* | (2006.01) |
| *G21B 1/17* | (2006.01) |
| *G21B 1/21* | (2006.01) |
| *H05H 1/12* | (2006.01) |

(52) U.S. Cl.
CPC .................. *G21B 1/05* (2013.01); *G21B 1/11* (2013.01); *H05H 1/11* (2013.01); *G21B 1/057* (2013.01); *G21B 1/17* (2013.01); *G21B 1/21* (2013.01); *H01F 6/06* (2013.01); *H05H 1/12* (2013.01); *Y02E 30/10* (2013.01)

(58) Field of Classification Search
CPC ... G21B 1/05; G21B 1/11; G21B 1/21; G21B 1/17; G21B 1/057; G21B 1/00; H05H 1/11; H05H 1/12; H05H 1/00; H05H 1/02; H05H 1/10; H05H 1/16; H05H 1/24; H05H 1/245; H05H 1/246; H05H 1/54; H05H 5/00; H05H 5/04; H05H 7/20; H05H 2007/043; H05H 2242/22; H01F 6/06; H01F 6/00; Y02E 30/10
USPC ........ 376/100, 121, 127–130, 133, 139, 142
See application file for complete search history.

(56) References Cited

U.S. PATENT DOCUMENTS

| | | |
|---|---|---|
| 3,029,199 A | 4/1962 | Baker et al. |
| 3,386,883 A | 6/1968 | Farnsworth |

(Continued)

OTHER PUBLICATIONS

Hedditch, J et al., Fusion in a Magnetically-Shielded-Grid Inertial Electrostatic Confinement Device, Phys. Plasmas, 22 (10):1-14, Oct. 8, 2018.

(Continued)

*Primary Examiner* — Darlene M Ritchie
(74) *Attorney, Agent, or Firm* — Neugeboren O'Dowd PC

(57) ABSTRACT

A nuclear fusion reactor includes a chamber containing plasma and two or more devices which include superconducting electromagnetic coils. At least one of the two or more devices may be biased to a high voltage to provide thermal energy to ions in the magnetic confinement region. In some examples, the chamber and the two or more devices can be coaxial and toroid shaped. In some examples, the chamber can be spherical or cylindrical with the two or more devices being toroid or elongated toroid shaped and formed on opposite faces of a cuboid. The two or more devices may be disposed in the chamber to provide a high-beta magnetic confinement region for the plasma.

18 Claims, 7 Drawing Sheets

(56) References Cited

U.S. PATENT DOCUMENTS

| | | | |
|---|---|---|---|
| 3,736,539 A | 5/1973 | File et al. | |
| 4,166,760 A | 9/1979 | Fowler et al. | |
| 4,233,537 A * | 11/1980 | Limpaecher | H05H 1/14 |
| | | | 313/231.31 |
| 4,430,290 A | 2/1984 | Kiryu | |
| 4,749,540 A | 6/1988 | Bogart et al. | |
| 4,826,646 A | 5/1989 | Bussard | |
| 7,935,922 B2 | 5/2011 | Gonin et al. | |
| 8,279,030 B2 | 10/2012 | Baker et al. | |
| 2003/0223528 A1 | 12/2003 | Miley | |
| 2004/0130277 A1 | 7/2004 | Monkhorst et al. | |
| 2006/0198485 A1 | 9/2006 | Binderbauer | |
| 2008/0187086 A1 * | 8/2008 | Bussard | H05H 1/11 |
| | | | 376/127 |
| 2011/0085632 A1 * | 4/2011 | Klein | H05H 1/11 |
| | | | 376/129 |
| 2011/0200153 A1 * | 8/2011 | Ferreira, Jr. | H05H 1/11 |
| | | | 376/127 |
| 2011/0274228 A1 * | 11/2011 | Lopez | G21B 3/00 |
| | | | 376/146 |
| 2014/0321587 A1 * | 10/2014 | Jarboe | G21B 1/05 |
| | | | 376/133 |
| 2014/0357495 A1 * | 12/2014 | Daibo | C01G 3/006 |
| | | | 505/211 |
| 2015/0380114 A1 * | 12/2015 | Park | G21B 1/05 |
| | | | 376/144 |
| 2017/0025189 A1 * | 1/2017 | Rostoker | H05H 1/10 |
| 2017/0062078 A1 | 2/2017 | Minovitch | |
| 2017/0337991 A1 * | 11/2017 | Binderbauer | G21B 3/006 |
| 2018/0068748 A1 * | 3/2018 | McGuire | G21B 1/057 |
| 2018/0114603 A1 * | 4/2018 | Rogers | G21B 1/15 |

OTHER PUBLICATIONS

International Searching Authority, International Search Report and Written Opinion, issued for International Application No. PCT/US2019/055044, dated Jan. 10, 2020 (9 pages).

* cited by examiner

NUCLEAR FUSION REACTOR WITH TOROIDAL SUPERCONDUCTING MAGNETIC COILS IMPLEMENTING INERTIAL ELECTROSTATIC HEATING

CROSS-REFERENCES TO RELATED APPLICATIONS

This application claims priority to and the benefit of U.S. Provisional Application No. 62/742,416, filed Oct. 7, 2018, which is hereby incorporated by reference, in its entirety and for all purposes.

TECHNICAL FIELD

The present technology pertains to nuclear reactors, and more specifically to nuclear reactors with superconducting magnetic coils used for plasma confinement.

BACKGROUND

Nuclear fusion is a process by which two nuclei combine to form a heavier nucleus. Nuclear fusion can generate a large quantity of energy in the form of fast moving neutrons and other nuclear products. There are some barriers which hinder nuclear fusion. For example, protons contained within the two nuclei contribute to the two nuclei being positively charged. The positive charges create a repulsive electrostatic barrier or Coulomb barrier between the two nuclei, where the Coulomb barrier must be overcome for the two nuclei to fuse. In some approaches, extremely high thermal energies may be provided to the two nuclei, in the order of hundreds of millions of degrees Kelvin, to enable the two nuclei to overcome the Coulomb barrier and fuse. Inertial electrostatic confinement (IEC) is a technique for providing such high thermal energies to the nuclei.

IEC techniques may be implemented using IEC devices for trapping and heating ions in a potential well. An electric field may be used to heat fuel such as plasma up to the fusion thermal conditions. Various anode and cathode arrangements can be utilized for generating the electric field. In some examples, a concentric spherical anode and cathode arrangement with the cathode formed as an inner cathode grid is used to accelerate the ions towards the inner cathode grid to achieve the high energies for fusion. However, with such arrangements, there may be significant energy losses due to collisions or interceptions by the inner cathode grid.

In some implementations, the inner grid can be replaced by a virtual cathode. For example, by applying a positive bias to the inner grid, the inner grid focuses electrons and forms a virtual cathode. A potential well is subsequently formed between the anode grid and the virtual cathode, which can provide significant ion heating. However, such techniques also lead to high levels of electron loss due to collisions with the inner grid.

An alternative approach involves the formation of a virtual cathode by trapping electrons in a magnetic cusp. For example, an arrangement of current loops (e.g., a pair of current loops with opposite directions of current to form a magnetic mirror or a plurality of current loops positioned on the faces of a cube) can generate magnetic fields around them, with a magnetic null being formed at a center of the arrangement. The magnetic null is also referred to as the region in the center of a magnetic cusp. Ions introduced into a device or chamber which contains the arrangement of current loops are trapped in the cusp for a period of time, resulting in the formation of a virtual cathode. Known implementations do not utilize current loops, in toroidal configuration, as the grid. Known implementations suffer from inefficiencies caused by scattering and loss of electrons and ions from the geometric configuration of the cusp.

SUMMARY

Techniques and systems are described herein for shielded inertial electrostatic confinement systems and their use in nuclear fusion reactors. In some examples, an apparatus is described, where the apparatus includes an arrangement of two or more devices containing superconducting electromagnetic coils. The two or more devices may be disposed in a chamber, where the superconducting electromagnetic coils are electrically isolated from the chamber and electrically biased to high voltages (e.g., −60 KV) which provides thermal energy for nuclear fusion. The devices may be disposed in arrangements which allow creation of a magnetic null or cusp for confinement of ions when current is passed through the superconducting electromagnetic coils.

Vacuum conditions may be created in the chamber. Nuclear fuel such as plasma in the chamber can provide ions which are accelerated towards the electrically biased superconducting electromagnetic coils which form an anode or cathode, but the magnetic fields created around the superconducting electromagnetic coils divert the ions from collisions with the superconducting electromagnetic coils (also referred to as "grid collisions"). Thus the devices containing the superconducting electromagnetic coils are shielded from the ions and nuclear fusion of the ions is enabled at high efficiencies and low energy losses in the magnetic confinement region.

According to some examples, an apparatus for nuclear fusion is described, which includes a chamber comprising plasma. A first device is disposed in an interior portion of the chamber, the first device comprising superconducting electromagnetic coils configured to generate a first magnetic field when current is passed through the superconducting electromagnetic coils. A second device disposed in the interior portion of the chamber, the second device comprising superconducting electromagnetic coils configured to generate a second magnetic field when current is passed through superconducting electromagnetic coils, the first magnetic field and the second magnetic field forming a magnetic confinement region. The magnetic confinement region can provide confinement of plasma when the plasma is provided in the chamber for nuclear fusion of ions of the plasma.

In some examples, at least one of the first device and the second device is biased to a high voltage, where the high voltage bias provides heating of the plasma and attracts the ions. In some examples, the first magnetic field and the second magnetic field are configured to shield the first device and the second device respectively, and direct the ions to the magnetic confinement region. In some examples, the superconducting electromagnetic coils include a metal encasing with an internal track and superconducting material disposed in the internal track.

In some examples, the apparatus further includes two or more supporting structures configured to provide physical support and electrical insulation from the chamber to the first device and the second device. At least one supporting structure of the two or more supporting structures can include a hollow interior configured to provide a passage for the superconducting electromagnetic coils. In some examples, the first device and the second device can be cryogenically cooled with liquid cryogen circulated through the passage. In some examples, at least one supporting structure comprises a first end and a second end, with the first end being physically coupled to the first device or the second device and the second end being physically coupled to an interior wall of the chamber, wherein terminal ends of a superconducting electromagnetic line for forming the superconducting electromagnetic coils are passed through the passage from the first end to the second end and electrically connected to a current source.

In some examples, the first device and the second device are toroid shaped with a respective first housing and second housing in which the superconducting electromagnetic coils are disposed. In some examples, the chamber is also toroid shaped, with the first device and the second device being coaxial with the chamber. In some examples, the apparatus may further include one or more additional devices comprising superconducting magnetic coils for carrying currents to generate one or more additional magnetic fields, the one or more additional devices being coaxial with the first device, the second device, and the chamber, where the first magnetic field, the second magnetic field, and the one or more additional magnetic fields form a further magnetic confinement region.

In some examples of the apparatus, the chamber can be spherical, with the first device and the second device being toroid shaped and formed on opposite faces of a cuboid. In some examples, the chamber may be cylindrical, with the first device and the second device being elongated toroid shaped and formed on opposite faces of a cuboid.

In some examples, an apparatus for a nuclear fusion reactor is described, where the apparatus includes a chamber. A first device coaxial with the chamber is disposed in an interior portion of the chamber, the first device comprising superconducting electromagnetic coils configured to carry current for generating a first magnetic field. A second device coaxial with the chamber and disposed in the interior portion of the chamber, the second device comprising superconducting electromagnetic coils configured to carry current for generating a second magnetic field, the first magnetic field and the second magnetic field forming a magnetic confinement region, whereby the magnetic confinement region provides confinement of plasma when the plasma is provided in the chamber for nuclear fusion of ions of the plasma. In some examples, the chamber, the first device, and the second device are toroid shaped. In some examples, the first device and the second device are biased to high voltage to attract the ions, with the first magnetic field and the second magnetic field shielding the first device and the second device, respectively, from the ions. In some examples, the magnetic confinement region comprises a high-beta confinement region for the plasma.

In some examples, a nuclear fusion reactor is described, which includes a chamber and two or more devices comprising superconducting electromagnetic coils, wherein the two or more devices are disposed in the chamber to provide a magnetic confinement region when current is passed through the superconducting electromagnetic coils to generate two or more magnetic fields, whereby the magnetic confinement region provides confinement of plasma when the plasma is provided in the chamber for nuclear fusion of ions of the plasma. In some examples, the chamber and the two or more devices are coaxial. In some examples, the chamber and the two or more devices are toroid shaped. In some examples, the nuclear fusion reactor further includes two or more supporting structures for the two or more devices, wherein at least one supporting structure comprises a first end and a second end, with the first end being physically coupled to a first device of the two or more devices and the second end being physically coupled to an interior wall of the chamber, wherein terminal ends of a superconducting electromagnetic line for forming the superconducting electromagnetic coils are passed through a passage in the at least one supporting structure from the first end to the second end and electrically connected to a current source.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figures 1A, 1B:
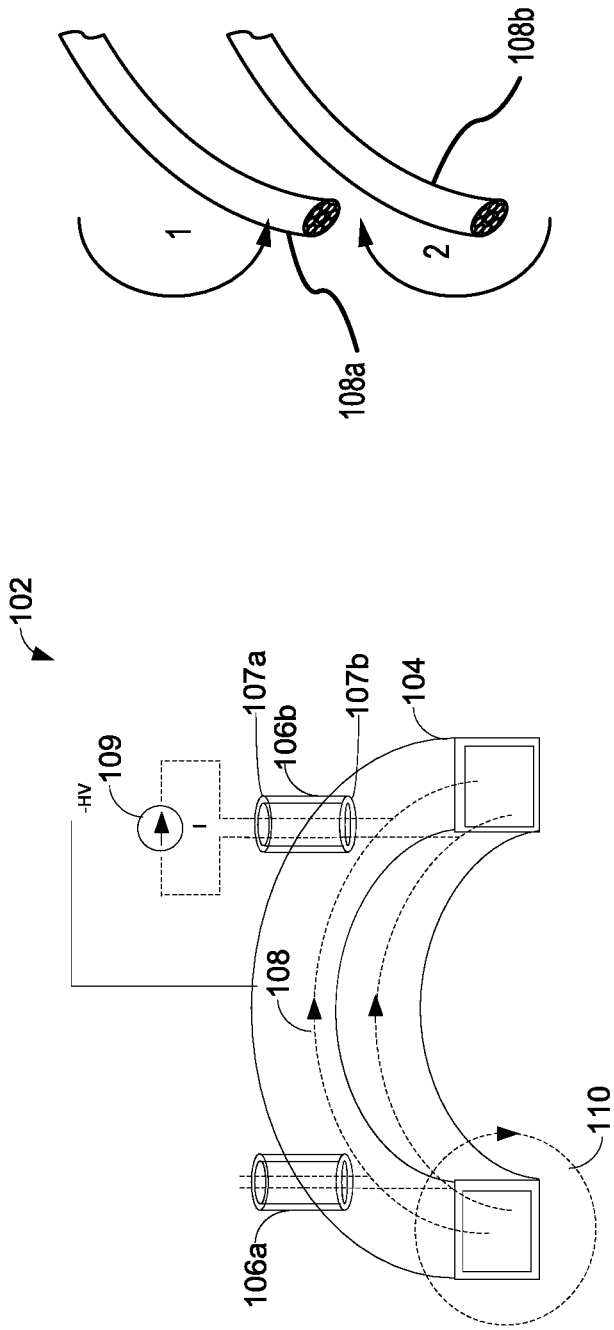
FIG. 1A illustrates a cross-sectional view of a device including superconducting electromagnetic coils, according to aspects of this disclosure.
FIG. 1B illustrates a side view of superconducting electromagnetic coils, according to aspects of this disclosure.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to an aspect in the present disclosure can be references to the same aspect or any aspect; and, such references mean at least one of the aspects.

Reference to an aspect means that a particular feature, structure, or characteristic described in connection with the aspect is included in at least one embodiment of the disclosure. References to an aspect in various portions of the specification are not necessarily referring to the same aspect, nor are separate or alternative aspects mutually exclusive of other aspects. Moreover, various features are described which may be exhibited by some aspects and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technologies address the need in the art for improved inertial electrostatic confinement systems and their use in nuclear fusion reactors. In some examples, an apparatus is described, where the apparatus includes an arrangement of two or more devices containing superconducting electromagnetic coils. The two or more devices may be disposed in a chamber, where the superconducting electromagnetic coils are electrically isolated from the chamber and electrically biased to high voltages which provide thermal energy for nuclear fusion. The devices may be disposed in arrangements which allow creation of a magnetic null or cusp for confinement of ions when current is passed through the device and the superconducting electromagnetic coils via contact between the device and the coils.

Vacuum conditions may be created in the chamber. Nuclear fuel such as plasma in the chamber can provide ions which are accelerated towards the electrically biased superconducting electromagnetic coils which form an anode or cathode, but the magnetic fields created around the superconducting electromagnetic coils divert the ions towards the magnetic confinement region. Thus the devices containing the superconducting electromagnetic coils are shielded from the ions and nuclear fusion of the ions is enabled at high efficiencies and low energy losses in the magnetic confinement region. In example aspects, the magnetic confinement region provides inertial electrostatic confinement in a high-beta configuration for strong and efficient plasma containment. Accordingly in example aspects, the apparatus provides a nuclear reactor which includes a so called shielded inertial electrostatic containment (IEC) system for plasma heating.

FIG. 1A illustrates a cross-sectional view of a device 102 which may be used in the shielded IEC systems according to various aspects of this disclosure. The device 102 can include a housing 104 with a hollow interior which can accommodate one or more superconducting electromagnetic coils 108 in contact with the housing 104. The housing 104 can be shaped like a toroid when viewed in three dimensions (3D). A toroid refers to a surface of revolution with a hole in the middle, like a doughnut. An axis of revolution of the toroid passes through the hole such that the axis does not intersect a surface or body of the toroid. For example, when a rectangle is rotated around an axis parallel to one of its edges, then a hollow rectangle-section ring is produced. If the rotated shape is a circle, then a hollow circle-section ring is produced, which referred to as a torus. In the example shown, the housing 104 includes a rectangle (or square) shape in its cross-section, but in other examples, the housing 104 can include any other type of a toroid or a torus which can accommodate a plurality of lines or layers of the superconducting electromagnetic coils 108. In some examples, a superconducting electromagnetic line may be wound a plurality of times along, and in contact with, the walls of the hollow interior to produce the plurality of superconducting electromagnetic coils 108. In some examples, the interior of the housing 104 can include tracks for accommodating and/or contacting the superconducting electromagnetic coils 108.

In some examples, the superconducting electromagnetic coils 108 can be made of a superconducting substance such as rare-earth barium copper oxide (REBCO) encased in a conducting wire such as a copper wire or other metal encasing, which additionally enables non-superconducting conduction between the superconducting electromagnetic coils 108 and the housing 104. For example, the superconducting substance may be disposed in an internal track provided in the metal encasing. Although any superconducting material may be used in the device 102, materials such as REBCO can exhibit high temperature superconductivity and have the potential to sustain stronger magnetic fields than other superconducting materials. Due to their stronger magnetic field and their relatively high superconducting critical temperature REBCO can deliver superior magnetic confinement and allow compact and economical constructions. It is noted that even though the metal encasing in which the superconducting electromagnetic coils 108 are encased is conductive, the conductivity of the metal encasing is significantly lower than the conductivity of the superconducting electromagnetic coils 108. Therefore the metal encasing can provide electrical insulation between adjacent superconducting windings of the superconducting electromagnetic coils 108, without risk of short circuit superconducting currents between the superconducting electromagnetic coils 108 disposed in the device 102, yet allow equalization of voltage between the superconducting electromagnetic coils 108 and the housing 104.

Figure 1C:
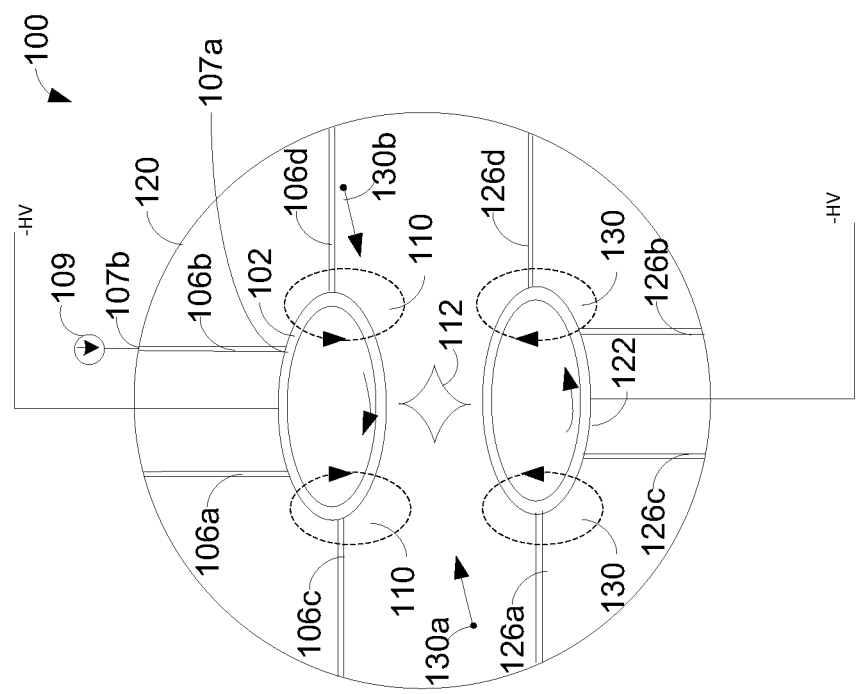
FIG. 1C illustrates a side view of a spherical nuclear reaction chamber with two or more devices carrying superconducting electromagnetic coils, according to aspects of this disclosure.

One or more structures 106a-b can be coupled to the housing 104. The one or more structures 106a-b can provide physical support as well as electrical isolation, as will be described in further detail in the following sections. The structures 106a-b can include a hollow interior and an exterior made of a thermally resistant and electrically insulating material such as enamel. At the point of attachment of the one or more structure 106a-b to the housing 104, holes can be created on the surface and interior of the housing 104 such that the one or more structures 106a-b can function as conduits to the interior of the housing 104. For example, the structure 106b illustrated in greater detail is shown to include a first end 107a and a second end 107b. The first end 107a may be physically coupled to the device 102 and the second end 107b may be physically coupled to an interior wall of a chamber (e.g., the chamber 120 as shown in FIG. 1C and described in further detail below).

In examples where the superconducting electromagnetic coils 108 are obtained by winding a single superconducting electromagnetic line a plurality of turns along and in contact with the interior of the housing 104, terminal ends of the superconducting electromagnetic line can be passed through one or more of the structures 106a-b. In some examples, For example, the terminal ends of the superconducting electromagnetic line used for forming the superconducting electromagnetic coils 108 may be passed through a passage provided in the structure 106b between the first end 107a and the second end 107b to allow electrical connection of the terminal ends to a current source 109. In some examples, one end of the superconducting electromagnetic line can be fed in and passed through the hollow interior of the structure 106a, wound a plurality of times in and in contact with the interior of the housing 104, and the other end of the superconducting electromagnetic line can be passed through and fed out of the same structure 106a. In some examples, the other end can be fed out of the structure 106b. In some examples, other structures similar to the structures 106a-b can also be coupled to the housing 104, and one or both of the ends of the superconducting electromagnetic line may be passed through some structures while some other structures need not be used as conduits for the superconducting electromagnetic line. In some examples, one or more of the structures such as the structures 106a-b can function as conduits for purposes other than providing a path to the superconducting electromagnetic line. For example, one or more of the structures such as the structures 106a-b can function as conduits for carrying cooling materials to be circulated through the interior of the housing 104, as will be described in further detail in the following sections.

By feeding in and out the ends of the superconducting electromagnetic line through one or more of the structures 106a-b, the terminal ends of the superconducting electromagnetic line can be coupled to the current source 109 or a power supply source. In some examples, the current source 109 can be located outside the housing 104, and in some examples, the current source 109 can be located outside the chamber, as shown in FIG. 1C. The superconducting electromagnetic coils 108 disposed in a toroid shaped housing 104 can form a solenoid. The current source 109 can supply high current which circulates through the superconducting electromagnetic coils 108 to generate a magnetic field in an azimuthal direction (e.g., perpendicular) to the direction of current flow. For example, a magnetic field 110 in a clockwise direction can result from current flowing from right to left (i.e., in an anti-clockwise direction when viewed from the top) as indicated by directional arrows through the superconducting electromagnetic coils 108. A strong magnetic field can be generated based on the combination of magnetic fields generated by each of the superconducting electromagnetic coils 108 through which current flows. In some examples, the current source 109 can supply a high current (e.g., in an order of 200 A or more, provided at a low voltage such as 2V) to flow through the superconducting electromagnetic coils 108. In some examples, the toroid shaped housing 104 can induce efficient magnetic curvatures which can generate a uniform and strong magnetic confinement region 112 for use in high-beta magnetic confinement of plasma, as discussed in the following sections.

In some examples, the housing 104 can be biased to an extremely high voltage to attract ions towards the device 102. In some examples, the extremely high voltage can include a negative voltage which may be obtained by connecting the housing 104 to a negative voltage supply, e.g., obtained from a direct current (DC) voltage supply such as a battery or power supply. In some examples, the housing 104 can be biased to an extremely high voltage such as −60 KV. It is understood that the specific value of the high voltage used for biasing the housing 104 can be adjusted as suitable for particular implementations. For example, the high voltage value can be based on the desired high temperatures to be achieved by heating the housing 104 using the high voltage biasing. As such the high voltage can be in a suitable range which can include tens or hundreds of thousands of kilovolts.

In some examples, the housing 104, and thus the superconducting electromagnetic coils 108 via contact with the housing 104, can be biased to an extremely high voltage to attract ions towards the device 102. In some examples, the extremely high voltage can include a negative voltage which may be obtained by connecting the housing 104 to a negative voltage supply, e.g., obtained from a direct current (DC) voltage supply such as a battery or power supply. In some examples, the housing 104, and thus the superconducting electromagnetic coils 108, can be biased to an extremely high voltage such as −60 KV. It is understood that the specific value of the high voltage used for biasing the housing 104 can be adjusted as suitable for particular implementations. For example, the high voltage value can be based on the desired high temperatures to be achieved by heating the housing 104 using the high voltage biasing. As such the high voltage can be in a suitable range which can include tens or hundreds of thousands of kilovolts.

In some examples, the extremely high voltage applied to the housing 104 and thus to the superconducting electromagnetic coils 108, can generate extremely high temperatures in regions surrounding the housing 104. For example, the device 102 can be used to heat plasma or nuclear fuel located at an exterior of the housing 104 when the device 102 is disposed in a chamber containing plasma. In some examples, the plasma can be heated to extremely high temperatures which are conducive to nuclear fusion. However, sustained high heating of the superconducting electromagnetic coils 108 in the interior of the housing 104 can result in significant wear and tear of the superconducting electromagnetic coils 108. To mitigate the effects of the extremely high heat, cryogenic cooling techniques can be used to cool the interior of the housing 104. In some examples, the hollow interiors of the one or more structures 106a-b can also be used for circulating a cooling material such as liquid cryogen through the interior of the housing 104. For example, liquid nitrogen can be pumped into and drained from the interior of the housing 104 using the one or more structures 106a-b. Thus, the one or more structures 106a-b can serve a dual purpose of channeling the superconducting electromagnetic line as well as circulating the liquid nitrogen through the interior of the housing 104. Circulating the liquid nitrogen can provide cryogenic cooling to the superconducting electromagnetic coils 108.

FIG. 1B illustrates a side view showing a cross section of two superconducting electromagnetic coils which may be disposed in a vacuum chamber according to some examples. The two superconducting electromagnetic coils 108a and 108b can be wound in opposite directions. For example, the superconducting electromagnetic coil 108a can be obtained by winding a superconducting electromagnetic line in one direction along and in contact with the interior of the housing 104, while the superconducting electromagnetic coil 108b can be obtained by winding the same or a different superconducting electromagnetic line the opposite direction along and in contact with interiors of separate housings, where the separate housings can be disposed in the vacuum chamber. Without loss of generality, in some examples, ends of a superconducting line for one direction of the superconducting electromagnetic coils such as for the superconducting electromagnetic coils 108a can be fed through one structure, such as the structure 106a, and the ends of a superconducting line for the opposite direction of the superconducting electromagnetic coils such as for the superconducting electromagnetic coils 108b can be fed through another structure such as the structure 106b.

FIG. 1C illustrates a side view of a nuclear reactor 100 configured according to example aspects of this disclosure. In some examples, the nuclear reactor 100 can include one or more devices such as the device 102 discussed with reference to FIGS. 1A-B above. The nuclear reactor 100 can include a chamber 120 in which the nuclear reactions can occur. In some examples the chamber 120 can be constructed from materials such as stainless steel, or aluminum. The chamber 120 may be of any shape, and this example illustrates a spherical shape. For example, FIG. 1D, which will be discussed later, illustrates another example nuclear reactor 150 with a chamber 170 of a cylindrical shape.

In the chamber 120, two devices 102 and 122 are shown. The device 122 is similar to the device 120 discussed with reference to FIG. 1A, and so an exhaustive description of the device 122 will be avoided for the sake of brevity. The devices 102 and 122 can be of any geometric shape, and a circular or oval shape for the devices 102 and 122 is illustrated. In some examples, the devices 102 and 122 can be toroid shaped and formed on opposite faces of a cuboid. The devices 102 and 122 can be supported by structures which are similar to the structures 106a-b discussed with reference to FIG. 1A. In addition to the structures 106a-b, structures 106c-d are also shown in FIG. 1C, where the structures 106a-d (among possibly other such structures) can provide physical support by being attached to interior walls of the chamber 120. The structures 106a-d can also provide electrical insulation from the chamber 120. The structures 126a-d can perform similar functions of providing physical support and electrical insulation to the device 122.

Using the structures 106a-d and 126a-d, for example, the devices 102 and 122 can be arranged such that they act as magnetic mirrors. For example, superconducting electromagnetic coils in the device 102 can carry current in a clockwise direction and superconducting electromagnetic coils in the device 122 can carry current in an anti-clockwise direction as shown. The clockwise direction of current in the device 102 can generate the magnetic field 110 of one polarity as discussed with reference to FIG. 1A. Similarly, the anti-clockwise direction of current in the device 122 can generate the magnetic field 130 of an opposite polarity of the magnetic field 110. The devices 102 and 122 can be arranged such that the opposing polarities of the magnetic fields 110 and 130 (or simply, "opposing magnetic fields") can generate a magnetic null or cusp which can provide a magnetic confinement region 112 for ions. The superconducting electromagnetic coils in one or both of the devices 102 and 122 can be biased to extremely high voltages via contact with the device housings 104 to attract ions as well as to generate extremely high temperatures in the chamber 120.

An example process by which nuclear fusion reactions can be generated in the nuclear reactor 110 will now be described. The chamber 120 can be maintained at an extremely low atmospheric pressure, e.g., at vacuum or near vacuum conditions within the chamber. Nuclear fuel such as plasma can be introduced in the chamber 120 in the form of ionized gas. A sustained fusion reaction within the chamber can lead to thermal or electric power generation. In some non-limiting examples, isotopes of hydrogen can be fused. In some non-limiting examples, a single isotope (e.g., deuterium) may be fused, while in some examples, two isotopes of hydrogen (e.g., deuterium and tritium) may be fused. In some non-limiting examples, additional or alternative nuclear fuels may be fused to achieve the desired nuclear reactions.

Regardless of the specific isotopes or combinations which are used, the nuclear reaction may proceed by causing two ions to collide at great force and cause them to react and release energy. In the instance of hydrogen isotope, most of the energy is carried off in the neutron. In a fusion power plant in which the nuclear reactor 100 may be disposed, the neutrons can be used to heat a lithium blanket that. A heat exchanger can boil water for steam turbines using the heated lithium blanket to generate electricity. In addition, reactions between the neutrons and the lithium nuclei can generate more isotopes.

As previously noted, for the isotopes to react, they must collide with very high energy. The extremely high voltage biasing the devices 102, 122 can generate extremely high temperatures which can provide the energy for enabling the fusion reaction. For example, the magnetic confinement region 112 can be heated to extremely high temperatures.

Example isotopes or ions 130a and 130b are shown in FIG. 1C. The negative voltage bias on the devices 102, 122 attracts ions 130a and 130b and causes them to accelerate towards the devices 102, 122 at high velocities. However, to avoid collisions with the devices 102, 122 themselves, the magnetic forces generated by the magnetic fields 110 and 130 provide a shield to the devices 102, 122, respectively. For example, the magnetic fields 110 and 130 repel and redirect the ions 130a-b towards the magnetic confinement region 112. The magnetic confinement region 112 provides increased time for the ions 130a-b to collide. The collisions generate more plasma ions which circulate in and out of the magnetic confinement region 112. These additional electromagnetic forces combined with the high energy accelerations of ions towards the magnetic confinement region 112 can make confinement of the plasma in the magnetic confinement region 112 challenging. The plasma and/or ions can escape from the magnetic confinement region 112 after having spent little or insufficient time in the magnetic confinement region 112 to undergo fusion and produce thermal energy. It is desirable to generate more thermal energy from the nuclear fusion than the energy consumed by the nuclear reactor in generating the electrical heating and magnetic fields. The use of superconducting magnetic coils in the devices 102, 122 of the nuclear reactor 100 reduces the energy consumed in generating the magnetic fields, as noted above and decreases plasma losses.

Figure 1D:
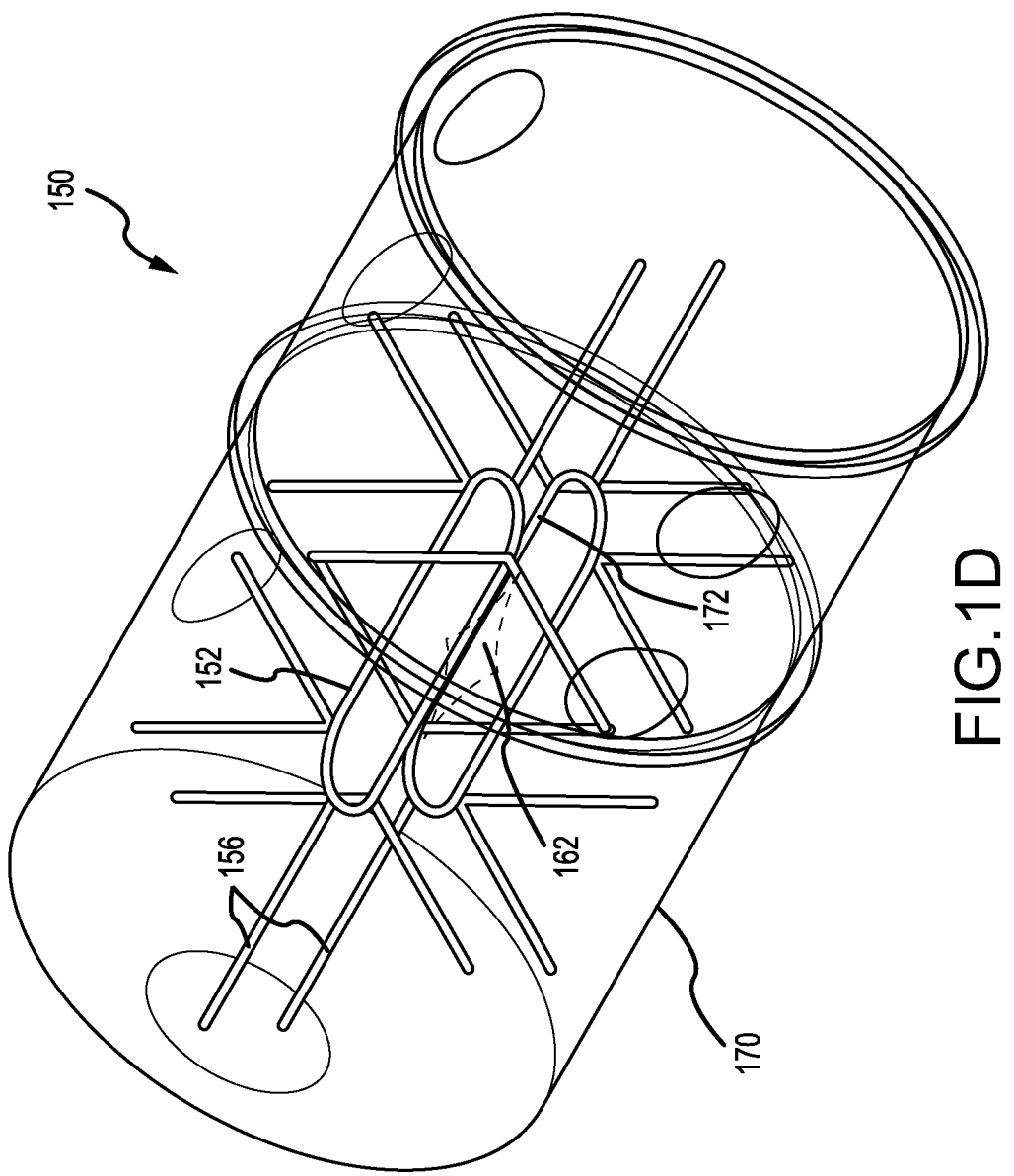
FIG. 1D illustrates a side view of cylindrical nuclear reaction chamber with two or more devices carrying superconducting electromagnetic coils, according to aspects of this disclosure.

FIG. 1D illustrates a three-dimensional view of a nuclear reactor 150 with a chamber 170 of cylindrical shape. The nuclear reactor 150 is similar in many aspects to the nuclear reactor 100 and so the similar features will not be repeated. In the nuclear reactor 150, a plurality of devices 152 and 172 are shown, which may be supported by several structures collectively identified as structures 156. The devices 152 and 172 can be elongated toroid shaped and formed on opposite faces of a cuboid. The structures 156 may be similar to the structures 106a-d and 126a-d discussed with reference to FIG. 1C.

The arrangement of the elongated devices 152 and 172 can generate different shapes and/or properties of a magnetic confinement region when current is passed through them. For example, the elongated device 152 can carry current in one direction and the elongated device 172 can carry current in an opposite direction of the current in the elongated device 152. A magnetic confinement region 162 may be formed as a result of the magnetic fields generated by the currents in the elongated devices 152 and 172. The magnetic confinement region 162 generated by using the elongated devices 152 and 172 can include properties such as increased length and volume in comparison to the magnetic confinement region 112. Thus in some examples where the magnetic confinement region 162 of increased length and volume may be desirable, the elongated devices 152 and 172 can be utilized as an alternative to regular toroid shaped devices 102 and 122 discussed with reference to FIG. 1C.

Figure 2A:
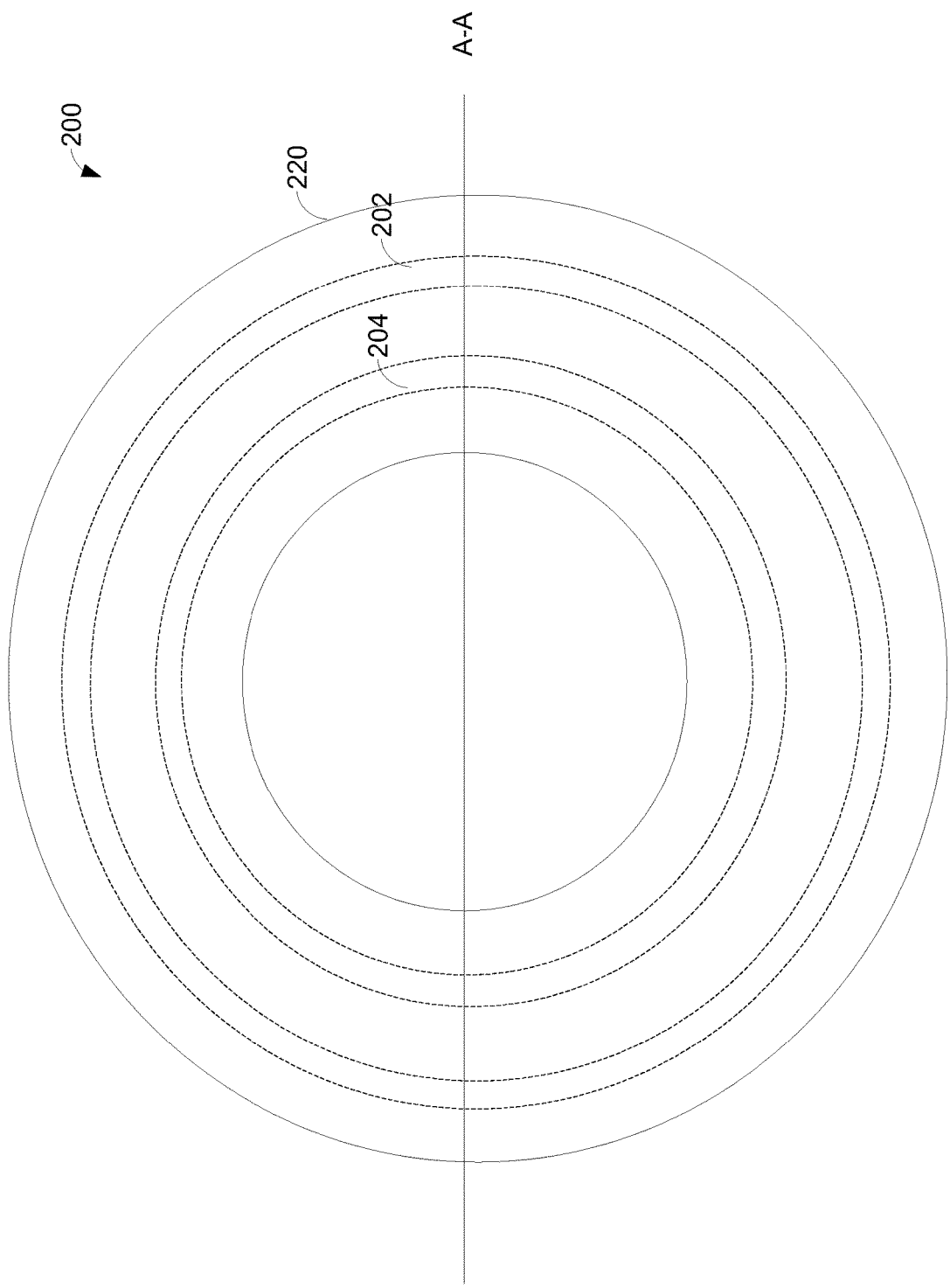
FIG. 2A illustrates a top view of a toroid shaped nuclear reaction chamber with two or more coaxial devices carrying superconducting electromagnetic coils, according to aspects of this disclosure.
Figure 2B:
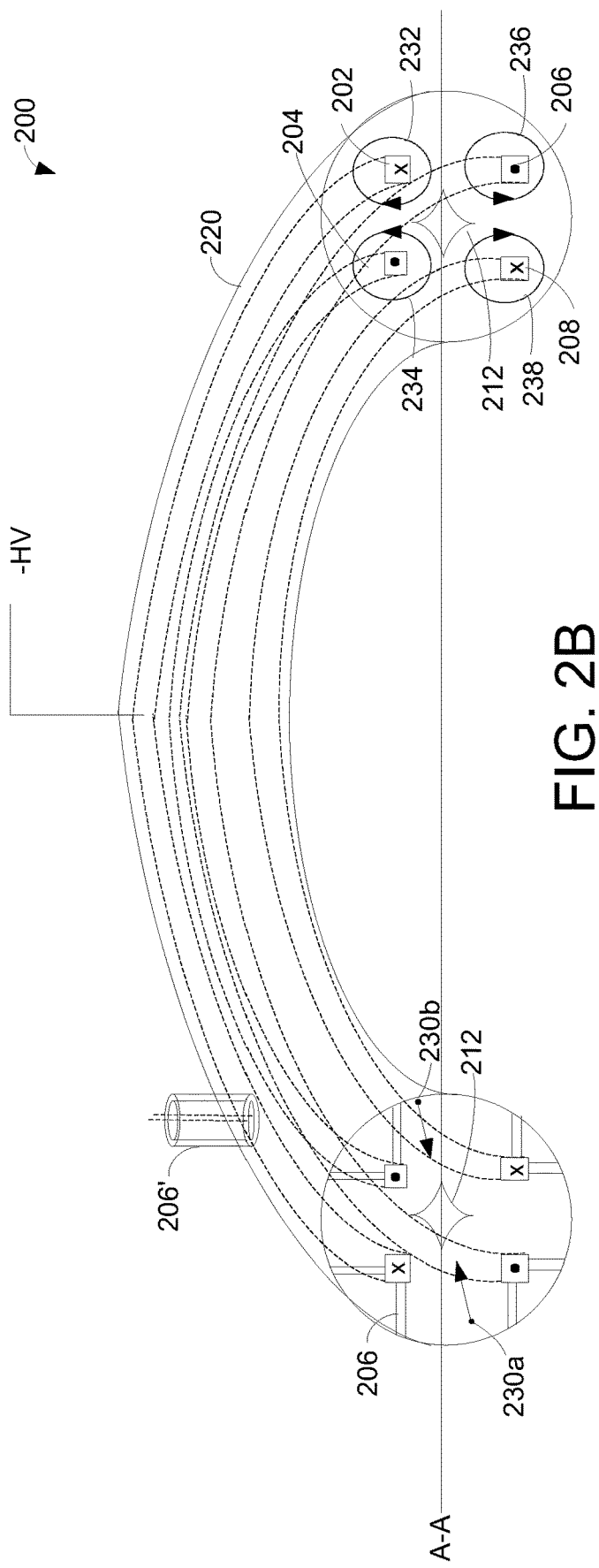
FIG. 2B illustrates a cross-sectional view of a toroid shaped nuclear reaction chamber with two or more coaxial devices carrying superconducting electromagnetic coils, according to aspects of this disclosure.
Figure 2C:
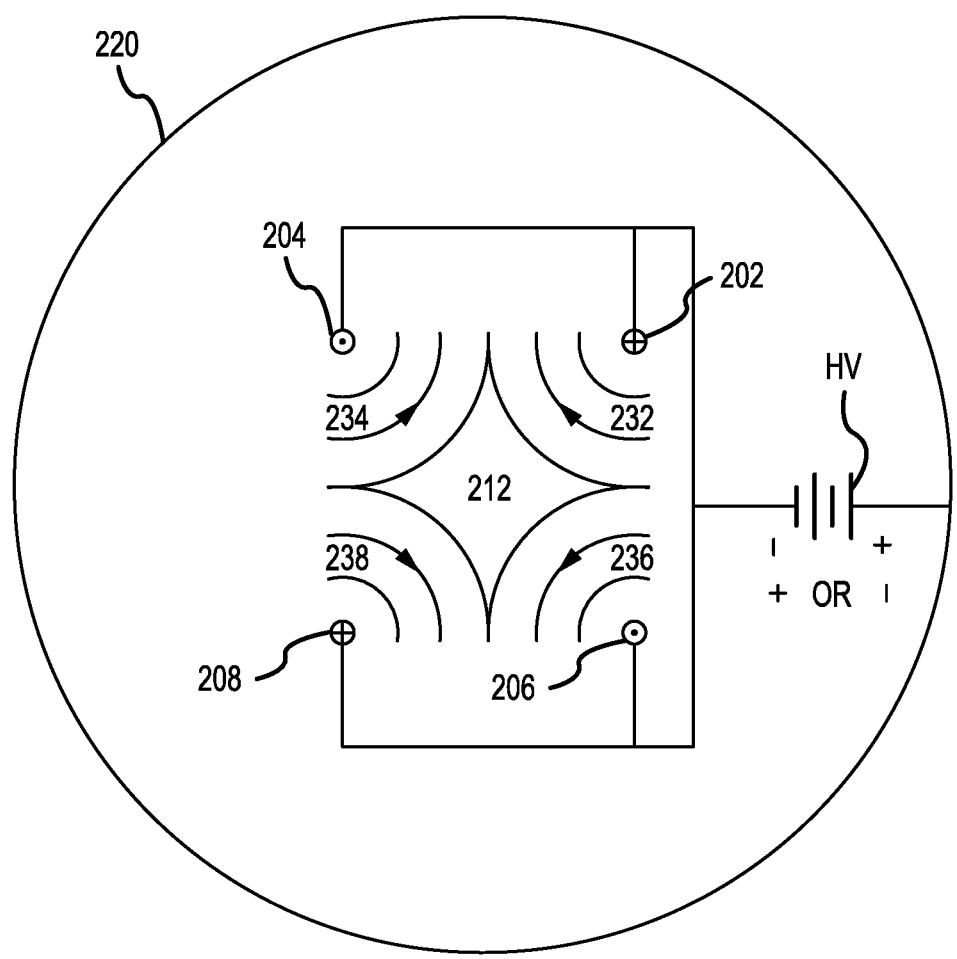
FIG. 2C illustrates a schematic view of a magnetic confinement region formed by two or more coaxial devices carrying superconducting electromagnetic coils, according to aspects of this disclosure.

FIGS. 2A-C illustrate different views of another nuclear reactor 200. The nuclear reactor 200 is configured to produce an improved magnetic confinement region for sustained nuclear reaction and energy generation. In some examples, the nuclear reactor 200 can differ from the nuclear reactors 100 and 150 in one or more aspects such as a shape of a chamber in which devices carrying superconducting electromagnetic coils are disposed, and a relative arrangement of the devices with respect to one another and with respect to the chamber. The configuration of the nuclear reactor 200 is referred to as a toroidal geometric configuration, the details of which will now be provided.

FIG. 2A illustrates a top view the nuclear reactor 200. In this view, salient aspects related to the shapes and relative arrangements of two or more devices 202, 204 carrying superconducting electromagnetic coils and a chamber 220 are shown. For example, the chamber 220 as well as two or more devices 202, 204 contained within the chamber 220 may all be constructed in the shape of a toroid. Two more devices 206 and 208 are hidden in this view, but may be provided underneath the devices 202 and 204 when viewed from the top. The chamber 220 and the two or more devices 202-208 can be coaxial in some examples. The devices 202-208 may be constructed similar to the device 102 discussed in detail with reference to FIG. 1A. For example, the devices 202-208 can each include a plurality of superconducting electromagnetic coils in contact with a housing thereof, where the superconducting electromagnetic coils can include superconducting material encased within a metal encasing (e.g., disposed along an internal track of the metal encasing). A cross-sectional view of the nuclear reactor 200 along the line A-A shown in FIG. 2B will facilitate further understanding of the nuclear reactor 200.

FIG. 2B illustrates a cross-sectional view of the nuclear reactor 200 along with additional details. In the example shown, the chamber 220 is illustrated as being shaped like a torus (i.e., a toroid having a circular cross-section). The devices 202, 204, along with two additional similar devices 206, 208 not specifically identified in FIG. 2A are shown as being shaped like a toroid with a rectangular face, similar to the device 102 of FIG. 1A. However, in various examples, the shapes of the devices 202-208 and the chamber 220 can include any other suitable shape compatible with the discussion herein.

As mentioned above, the devices 202-208 may each carry a plurality of superconducting electromagnetic coils, similar to the device 102 of FIG. 1A. Likewise, the devices 202-208 may also have respective supporting structures generally identified by the reference numeral 206 to facilitate physical contact and support with walls of the chamber 220, as well as to provide electrical insulation from the walls of the chamber 220. One instance of the support 206' has been shown in greater detail to illustrate its cylindrical shape with a hollow interior to serve the functions of being a conduit for one or more ends of a superconducting electromagnetic line, cryogenic coolant like liquid nitrogen, or combinations thereof. It is noted that the shape of the support 206' may also be a cuboid with a hollow interior and need not be cylindrical.

According to some examples, the two or more devices 202-208 can be arranged such that adjacent devices carry currents in opposite directions. For example, the "+" sign shown in the face of the devices 202 and 208 can indicate a first direction of current flow and the "−" sign shown in the face of the devices 204 and 206 can indicate a second direction of current flow which is opposite to the first direction. This way, any two adjacent devices can form magnetic mirrors, resulting in four pairs of magnetic mirrors which will be explained further below. The direction of current flow can be controlled by current sources such as the current source 109 which may be connected to ends of superconducting electromagnetic lines accessed through supporting structures such as the structure 206' connected to the respective devices 202-208.

FIG. 2C illustrates a further detailed view of the magnetic fields generated by the devices 202-208. With combined reference to FIGS. 2B-C, the devices 202-208 generate respective magnetic fields 232-238. For example, the devices 202 and 208 carrying current in the first direction generate anti-clockwise magnetic fields 232 and 238 respectively. The devices 204 and 206 carrying current in the second direction generate clockwise magnetic fields 234 and 236 respectively. There is a first magnetic mirror formed between the magnetic fields 232 and 234, a second magnetic mirror formed between the magnetic fields 234 and 238, a third magnetic mirror formed between the magnetic fields 236 and 238, and a fourth magnetic mirror formed between the magnetic fields 236 and 232. It is noted that while four devices 202-208 have been shown and described herein to form these four magnetic mirrors, adding more such devices can result in more magnetic mirrors or removing some devices can result in less magnetic mirrors. In example aspects, any two or more devices which are coaxial with the chamber 220 can be used to form two or more magnetic mirrors.

As a result of the four magnetic mirrors, a magnetic confinement region 212 can result when current flows through the devices 202-208 in their identified directions. The magnetic confinement region 212 can be of superior strength and efficiency due to their alignments which produce the magnetic confinement region 212. For example, unlike the previously described spindle cusp formed by two current loops on the faces of a cube, the magnetic confinement region 212 has uniform strength along the entire circumference of the toroid shaped devices 202-208. For example, the magnetic confinement region 212 can also be of a spindle shape in the cross-section and coaxial with the toroid shaped devices 202-208 as well as coaxial with the toroid shaped chamber 220. In some examples, the coaxial arrangement of the devices 202-208 can result in the magnetic confinement region 212 having high-beta confinement properties for plasma. Strong curvature in the magnetic field resulting from the opposing arrangement of the devices 202-208 imparted on diamagnetic plasma can increase confinement of the plasma. The effect of increased confinement of plasma is also referred to as high-beta confinement.

One or more of the devices 202-208 can be biased at a strong voltage, such as a strong negative voltage as previously described with reference to the nuclear reactor 100. This allows heating the plasma confinement region 212 to extremely high temperatures and also to attract ions.

A process of nuclear fusion in the nuclear reactor 200 will now be described. The chamber 220 can be maintained at an extremely low atmospheric pressure, e.g., at vacuum or vacuum-like conditions within the chamber. Nuclear fuel such as plasma can be introduced in the chamber 220 in the form of ionized gas. As previously described, any combination of deuterium or tritium can be used for the nuclear fuel. Example isotopes or ions 230a and 230b are shown in FIG. 2B. The negative voltage bias on the devices 202-208 (see FIG. 2C) attracts ions 230a and 230b and causes them to accelerate towards the devices 202-208 with high velocities. However, the magnetic forces generated by the magnetic fields 232-238 provide a shield for the devices 202-208. For example, the magnetic fields 232-238 repel and redirect the ions 230a-b towards the magnetic confinement region 212. The magnetic confinement region 212 provides sufficient thermal energy for the ions 230a-b to collide. The collisions generate more plasma ions which circulate in the magnetic confinement region 212 to produce additional ions which are made available for fusion. Since the magnetic confinement region 212 formed by the combination of four magnetic mirrors can provide strong confinement, the additional electromagnetic forces as well as the high energy accelerations of ions towards the magnetic confinement region 212 can be effectively contained. This leads to lower levels of plasma leakage or loss and improved confinement time within the magnetic confinement region 212. Subsequently, the number of nuclear fusion reactions which are enabled within the magnetic confinement region 212 is also improved, leading to generation of neutrons and thermal energy which can be in excess of approach the energy which is input to or consumed by the nuclear reactor 200.

Figure 3:
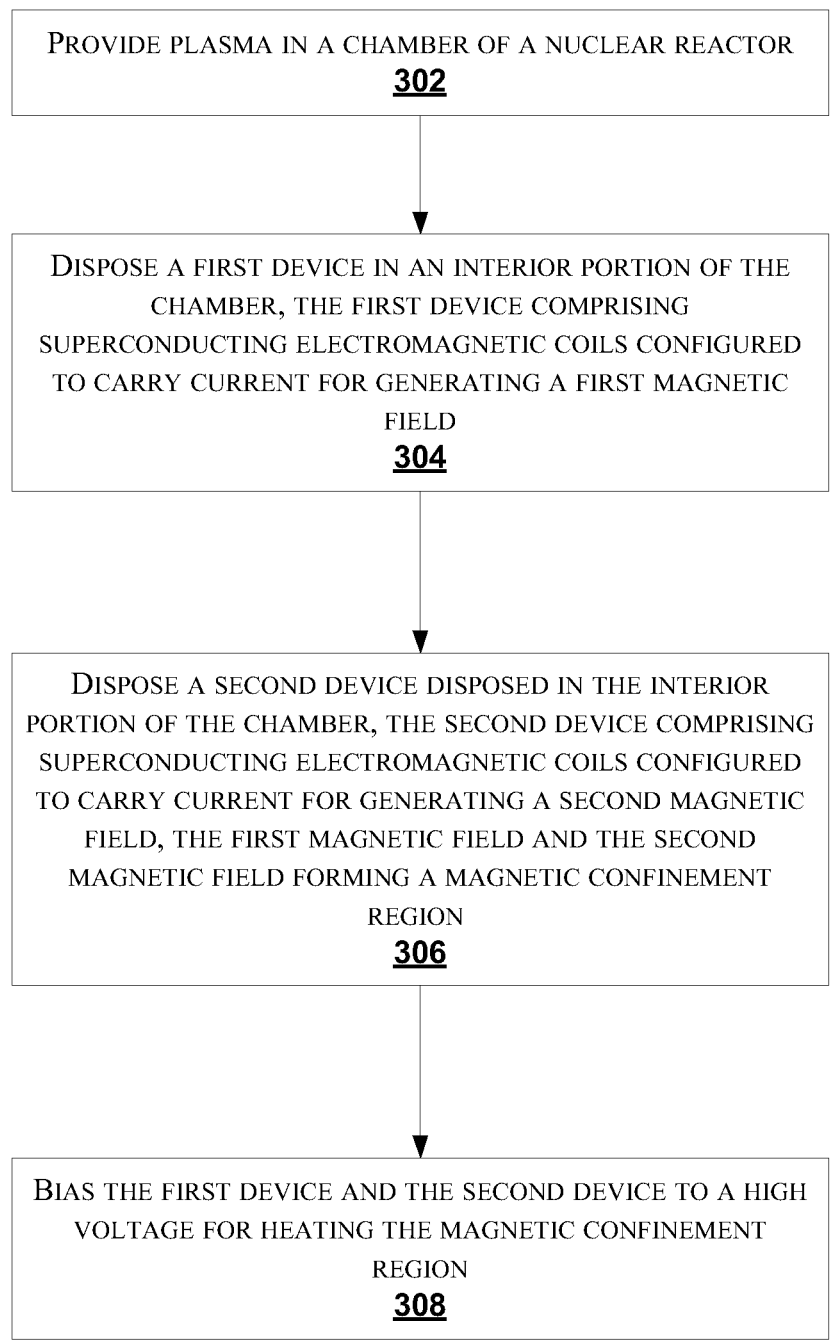
FIG. 3 illustrates a process of forming a nuclear reactor, according to aspects of this disclosure.

Having described example systems and concepts, the disclosure now turns to a process 300 for nuclear fusion, as illustrated in FIG. 3. The steps or blocks outlined herein are examples and can be implemented in any combination thereof, including combinations that exclude, add, or modify certain steps.

At block 302, the process 300 can include providing a chamber with nuclear fuel. For example, a vacuum chamber such as the spherical chamber 120, the cylindrical chamber 170, or the toroid shaped chamber 220 can be provided with plasma fuel. In some examples, the plasma can include any suitable combination of isotopes of hydrogen (e.g., deuterium, tritium, etc.). The chamber may be maintained at extremely low pressures or in vacuum conditions.

At block 304, the process 300 can include disposing a first device in an interior portion of the chamber, the first device comprising superconducting electromagnetic coils in contact with a housing thereof and configured to carry current for generating a first magnetic field. For example, the device 102 can be disposed in the chamber 120 with superconducting electromagnetic coils to carry current in a clockwise direction to form the first magnetic field 110. In other examples, the devices 102a-b can be disposed in the chamber 170 to form respective magnetic fields. Similarly, the device 202 can be disposed in the chamber 220 to form the magnetic field 232.

At block 306, the process 300 can include disposing a second device in the interior portion of the chamber, the second device comprising superconducting electromagnetic coils in contact with a housing thereof and configured to carry current for generating a second magnetic field, the first magnetic field and the second magnetic field forming a magnetic confinement region for nuclear fusion of ions of the plasma. For example, the device 122 can be disposed in the chamber 120 with superconducting magnetic coils to carry current in the anti-clockwise direction to generate the magnetic field 130. The magnetic field 130 can form a magnetic mirror with the magnetic field 110 and generate a magnetic null or cusp, which can act as a magnetic confinement region 112 in the nuclear reactor 100. Similarly, the devices 202a-b disposed in the chamber 170 can generate magnetic fields which mirror the magnetic fields of the devices 10a-b to form a magnetic confinement region in the nuclear reactor 150. In another example, the device 204 can be disposed in the chamber 220 to form the magnetic field 234 which mirrors the magnetic field 232 and forms the magnetic confinement region 212 in the nuclear reactor 200.

At block 306, the process 300 can include biasing the first device and/or the second device to a high voltage via contact with the housing, wherein the high voltage bias provides heating of the plasma and attracts the ions. For example, the high voltage can be an extremely high negative voltage (e.g., −60 KV) to which protons are attracted and also generates extremely high temperatures in the plasma (particularly in the magnetic confinement regions). In some examples, the respective magnetic fields can shield the magnetic devices and repel or redirect the attracted ions to the magnetic confinement region. The magnetic confinement region can include high-beta confinement of plasma conducive for nuclear fusion of the ions.

In some examples, two or more supporting structures can be provided for physical support and electrical insulation from the chamber to the first device and the second device. For example, the structures 106a-d, 126a-d, 156, and 206 can provide physical support and electrical insulation to respective devices to which they are attached. In some examples, the supporting structures can include a hollow interior configured to provide a passage for the superconducting electromagnetic coils, e.g., as described with reference to the structures 106a-b of FIG. 1A. In some examples, the first device and the second device may be cryogenically cooled with liquid cryogen circulated through the passage provided by the structures 106a-b.

In the various above-described examples, the superconducting electromagnetic coils can include a metal encasing with an internal track with superconducting material (e.g., REBCO) disposed in the internal track.

In some examples, the first device and the second device can be toroid shaped with a respective first housing and second housing in which the superconducting electromagnetic coils are disposed. For example, the device 102 can include the housing 104 containing the superconducting electromagnetic coils 108, where the housing 104 can be toroid shaped as shown in FIG. 1A.

In some examples, the chamber can also be toroid shaped, with the first device and the second device being coaxial with the chamber. For example, as shown in FIGS. 2A-C, the chamber 220 can be toroid shaped and coaxial with the devices 202, 204. The chamber 220 can also include one or more additional devices 206, 208 comprising superconducting magnetic coils for carrying currents to generate one or more additional magnetic fields 236, 238, the one or more additional devices being coaxial with the first device 202, the second device 204, and the chamber 220. The first magnetic field 232, the second magnetic field 234, and the one or more additional magnetic fields 236, 238 can form a further magnetic confinement region 212 for improved confinement of plasma and reduced heating and plasma losses.

For clarity of explanation, in some instances the present technology may be presented as including individual functional blocks including functional blocks comprising devices, device components, steps or routines in a method embodied in software, or combinations of hardware and software.

Devices implementing methods according to these disclosures can take any of a variety of form factors. Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. An apparatus comprising:
   a chamber at a first potential;
   a first device at a second potential disposed in an interior portion of the chamber, the first device comprising a first housing in electrical contact with first superconducting electromagnetic coils, also at the second potential, configured to generate a first magnetic field when current is passed through the first superconducting electromagnetic coils; and
   a second device at the second potential disposed in the interior portion of the chamber, the second device comprising a second housing in electrical contact with second superconducting electromagnetic coils, also at the second potential, configured to generate a second magnetic field when current is passed through second superconducting electromagnetic coils, the first magnetic field and the second magnetic field forming a magnetic confinement region, whereby the magnetic confinement region provides confinement of plasma when the plasma is provided in the chamber for nuclear fusion of ions of the plasma, wherein a difference between the first and second potential is at least 10,000 volts.

2. The apparatus of claim 1, wherein the first magnetic field and the second magnetic field are configured to shield the first device and the second device respectively, and direct the ions to the magnetic confinement region.

3. The apparatus of claim 1, wherein the first or second superconducting electromagnetic coils each comprise a metal encasing with an internal track and superconducting material disposed in the internal track.

4. The apparatus of claim 1, wherein the chamber is toroid shaped and the magnetic confinement region is coaxial with the chamber.

5. The apparatus of claim 1, wherein the chamber is spherical, with the first device and the second device being toroid shaped and formed on opposite faces of a cuboid.

6. The apparatus of claim 1, wherein the chamber is cylindrical, with the first device and the second device being elongated toroid shaped and formed on opposite faces of a cuboid.

7. The apparatus of claim 1, further comprising two or more supporting structures, wherein the two or more supporting structures are configured to provide physical support and electrical insulation from the chamber to the first device and the second device.

8. The apparatus of claim 7, wherein at least one supporting structure of the two or more supporting structures comprises a hollow interior configured to provide a passage for the first and/or second superconducting electromagnetic coils and liquid cryogen.

9. The apparatus of claim 8, wherein the at least one supporting structure comprises a first end and a second end, with the first end being physically coupled to the first device or the second device and the second end being physically coupled to an interior wall of the chamber, wherein terminal ends of a superconducting electromagnetic line for forming the first or second superconducting electromagnetic coils are passed through the passage from the first end to the second end and electrically connected to a current source.

10. The apparatus of claim 1, wherein the first device, the second device, and the chamber are toroid shaped, with the first device and the second device being coaxial with the chamber.

11. The apparatus of claim 10, further comprising one or more additional devices comprising superconducting magnetic coils for carrying currents to generate one or more additional magnetic fields, the one or more additional devices being coaxial with the first device, the second device, and the chamber, wherein the first magnetic field, the second magnetic field, and the one or more additional magnetic fields form a further magnetic confinement region.

12. An apparatus comprising:
    a chamber;
    a first device coaxial with the chamber and disposed in an interior portion of the chamber, the first device comprising a first housing in electrical contact with first superconducting electromagnetic coils configured to carry current for generating a first magnetic field; and
    a second device coaxial with the chamber and disposed in the interior portion of the chamber, the second device comprising a second housing in electrical contact with second superconducting electromagnetic coils configured to carry current for generating a second magnetic field, the first magnetic field and the second magnetic field forming a magnetic confinement region, whereby the magnetic confinement region provides confinement of plasma when the plasma is provided in the chamber for nuclear fusion of ions of the plasma, wherein
    the first and second devices are elongated toroids, and wherein
    the first and second devices and the first and second superconducting electromagnetic coils are at a potential difference from the chamber, the potential difference providing electrostatic acceleration of ions toward the magnetic confinement region.

13. The apparatus of claim 12, wherein the chamber, the first device, and the second device are toroid shaped.

14. The apparatus of claim 12, wherein the magnetic confinement region is coaxial with the chamber.

15. The apparatus of claim 12, wherein the potential difference is at least a 10,000 volts, with the first magnetic field and the second magnetic field shielding the first device and the second device, respectively, from the ions.

16. A nuclear fusion reactor comprising:
a chamber;
two or more devices each comprising a housing conductively coupled with superconducting electromagnetic coils, wherein the two or more devices are disposed in the chamber to provide magnetic confinement when current is passed through the superconducting electromagnetic coils to generate two or more magnetic fields, and to provide electrostatic confinement via at least a 10,000 volt bias between the (1) two or more devices, the housings, and the superconducting electromagnetic coils, and (2) the chamber, wherein this bias provides electrostatic acceleration of ions, that in combination with the magnetic confinement provides a combined confinement and acceleration of ions.

17. The nuclear fusion reactor of claim 16, wherein the chamber and the two or more devices are coaxial and toroid shaped.

18. The nuclear fusion reactor of claim 16, further comprising:
two or more supporting structures for the two or more devices, wherein at least one supporting structure comprises a first end and a second end, with the first end being physically coupled to a first device of the two or more devices and the second end being physically coupled to an interior wall of the chamber, wherein terminal ends of a superconducting electromagnetic line for forming the first and/or second superconducting electromagnetic coils are passed through a passage in the at least one supporting structure from the first end to the second end and electrically connected to a current source.

* * * * *